United States Patent [19]

Jeon

[11] Patent Number: 5,194,936
[45] Date of Patent: Mar. 16, 1993

[54] CIRCUIT FOR SELECTIVELY CONVERTING A COLOR BAR PATTERN

[75] Inventor: Dae-su Jeon, Kyunggi, Rep. of Korea

[73] Assignee: Samsung Electronics Co., Ltd., Suwon, Rep. of Korea

[21] Appl. No.: 519,445

[22] Filed: May 4, 1990

[30] Foreign Application Priority Data

May 13, 1989 [KR] Rep. of Korea ...................... 89-6434
Dec. 31, 1989 [KR] Rep. of Korea ..................... 89-21323

[51] Int. Cl.⁵ ............................................ H04N 17/02
[52] U.S. Cl. .................................................. 358/10
[58] Field of Search ............................................. 35/10

[56] References Cited

U.S. PATENT DOCUMENTS 4,089,026  5/1978  Wilhelm et al. ...................... 358/10

*Primary Examiner*—John W. Shepperd
*Attorney, Agent, or Firm*—Robert E. Bushnell

[57] ABSTRACT

A circuit for selectively converting a color bar pattern, comprising a switching means for selectively converting the circuit to the EIA mode or SMPTE mode, a line selecting means for counting the input number of the horizontal control signal reset by means of the vertical control signal and outputting the reversed chrominance forming signal in the line on which the reversed chrominance set is to be formed and outputting the pedestal forming signal in the line on which the pedestal set is to be formed, on said SMPTE color bar pattern by combining counting value thereof with the chrominance control signal, a reversed chroma set forming means for outputting said chrominance signal as it is if the reversed chrominance forming signal is not input from the line selecting means, and for outputting said chrominance forming after converting the color signal into the converting color signal forming said reversed chroma set if the reversed chrominance forming signal is input, a pedestal position selecting means for distributing a interval between said horizontal control signals as the reference, said reference pulse being reset by means of the horizontal control signal, and for outputtting the set-up level forming signal in the position where said pedestal set is to be formed on the SMPTE color bar pattern if the pedestal signal is input from the line selecting means, and a pedestal level forming means for receiving the set-up level forming signal of the pedestal position selecting means and for outputting the level up/down signal so that said pedestal set can be formed.

18 Claims, 9 Drawing Sheets

CIRCUIT FOR SELECTIVELY CONVERTING A COLOR BAR PATTERN

FIELD OF THE INVENTION

The present invention relates to a circuit for selectively converting a color bar pattern, and particularly to the selective converting circuit of the color bar pattern in which an EIA (Electronic Industries Association) color bar pattern can be converted selectively to a SMPTE (Society of Motion Picture and Television Engineers) color bar pattern.

BACKGROUND OF THE INVENTION

Generally, the color bar pattern means a test pattern which becomes a reference in the testing and adjusting of the color and luminance.

This color bar pattern is electrically generated and output instead of the video signal of the broadcasting equipment such as a camera. The color bar pattern generator, conventionally, is made up of a custom IC and is connected to a color coder of the camera for the broadcasting or business.

Of the existing color patterns in the broadcasting system of NTSC type, the color bar pattern which is being most widely used at present is the EIA color bar pattern under RS-189A in the EIA standards, which is shown in FIG. 1A.

In FIG. 1 the vertical lines show IRE units, while the horizontal lines show a horizontal scanning period.

The EIA color bar pattern is composed of a chroma set CS having 7 colors arranged in order of the luminance, and a black/white set BW in which the carrier signals Y, I and Q of the video signal are displayed.

In the standard EIA color bar pattern, the chroma set CS is displayed over 75% of the vertical effective period, Ev while the black/white set BW is displayed only over 25% thereof.

The chroma set CS is formed in such a manner that the vertical color bar of 75% white 75 W, yellow Y, cyan, green G, magenta M, red R, blue B is displayed with a width b corresponding to 1/7 of the width of the horizontal effective period Eh.

While, in the black/white set BW, I signal, 100% white 100 W and Q signal are each displayed with a width 5/4b, and black is displayed to the remaining width of the horizontal effective period Eh. The video outputs of this chroma set CS and black/white set BW are controlled by the horizontal and vertical control signals Ch and Cv of the horizontal and vertical blanking periods Bh and Bv, at this time, said horizontal and vertical control signals include for example, horizontal and vertical synchronizing signals or horizontal and vertical blanking pulses, etc.

The EIA color bar pattern shown in FIG. 1B is output with the same waveform as that shown in FIGS. 1A and 1C from the color bar pattern generator which is not shown.

In the chroma set CS, as shown in FIG. 1B, after a horizontal control signal Ch such as the horizontal synchronizing pulse is applied during the horizontal blanking period Bh, a chroma synchronizing signal or burst signal BS is supplied, and the vertical color bar is displayed during the horizontal effective period Eh in the above-mentioned order.

In the black/white set BW, the horizontal control signal Ch is applied thereto, then the burst signal BS is supplied, as shown in FIG. 1C, so that I, Q and black/white bars are displayed.

The difference between the lowest level of displayable black/white and O level of IRE unit of the input signal in the black/white set is called "set up".

At this time, since the burst signal BS is supplied commonly to the display of the chroma set CS and black/white set BW, color noise may be generated to the output of the black/white set BW.

To solve this problem, the EIA color generator outputs a separate color control signal to distinguish both outputs during display of the chroma set CS.

Thus, the EIA color bar generator outputs R,G,B signals displaying the colors, a chrominance signal of I,Q signals for carrying the color signal, a Y signal which indicates the luminance and is displayed by the black/white, and a chrominance control signal, at this time the chrominance control signal is output, for example during only 75% of the period of the vertical effective period Ev during output of the chroma set CS.

In the meanwhile, SMPTE have proposed a so-called "SMPTE color bar pattern".

This pattern is provided with a reversed chroma set RC in a portion of the chroma set CS of said pattern, and a pedestal set PED for displaying the set-up level in a portion of the black/white set BW.

In the pattern of the standard SMPTE color bar, the chroma set CS is displayed during a 67% period of the vertical effective period Ev, while the reversed chroma set RC is 8% and the black/white set Bw is only 25%, at this time the pedestal set PED is displayed by two parts, which are of a level-down portion PED 1 and a level-up portion PED 2 below magenta M and red R.

Such a SMPTE color bar pattern is easier in the testing and adjusting of the chrominance and luminance than the EIA color bar pattern, so that it is widely used gradually.

Therefore, it has a disadvantage that the broadcasting equipment provided with the EIA color bar pattern generator can not be used for generation of the SMPTE color bar pattern.

SUMMARY OF THE INVENTION

Accordingly, it is the object of the present invention to provide a circuit for selectively converting a color bar pattern, by which the EIA color bar pattern generated in the the EIA color bar pattern generator can be selectively converted into EIA color bar pattern or SMPTE color bar pattern according to the user's desire.

It is the another object of the present invention to provide a circuit for selectively converting a color bar pattern, by which the set-up level of the black/white set and the position and configuration of the pedestal unit in the output of the above-mentioned SMPTE color bar pattern can be adjusted.

For achieving the above and other objects, the selective converting circuit of the color bar according to the present invention comprises;

a switching means for selectively converting the circuit to the EIA mode or SMPTE mode;

a line selecting means for counting the input number of the horizontal control signal by reset by means of the vertical control signal and outputting the reversed chrominance forming signal in the line on which the reversed chrominance set is to be formed and outputting the pedestal forming signal in the line on which the pedestal set is to be formed, on said SMPTE color bar pattern by combining the counting value thereof with the chrominance control signal;

a reversed chroma set forming means for outputting said chrominance signal as it is if the reversed chrominance forming signal is not input from the line selecting means, and for outputting said chrominance signal after converting the color signal into the converting color signal forming said reversed chroma set if the reversed chrominance forming signal is input, a pedestal position selecting means for distributing an interval between said horizontal control signals as the reference, said reference pulse being reset by means of the horizontal control signal, and for outputting the set-up level forming signal in the position where said pedestal set is to be formed on the SMPTE color bar pattern if the pedestal signal is input from the line selecting means; and a pedestal level forming means for receiving the set-up level forming signal of the pedestal position selecting means and for outputting the level up/down signal so that said pedestal set can be formed.

The color bar pattern selecting and pattern circuit according to the present invention further includes a pedestal set adjusting means for adjusting the position and configuration of said pedestal set.

BRIEF DESCRIPTION OF THE ATTACHED DRAWINGS

For a better understanding of the invention, embodiments thereof will be described in more detail below with reference to the drawings, in which.

DETAILED DESCRIPTION OF THE PREFERRED EMBODIMENT

Figure 3:
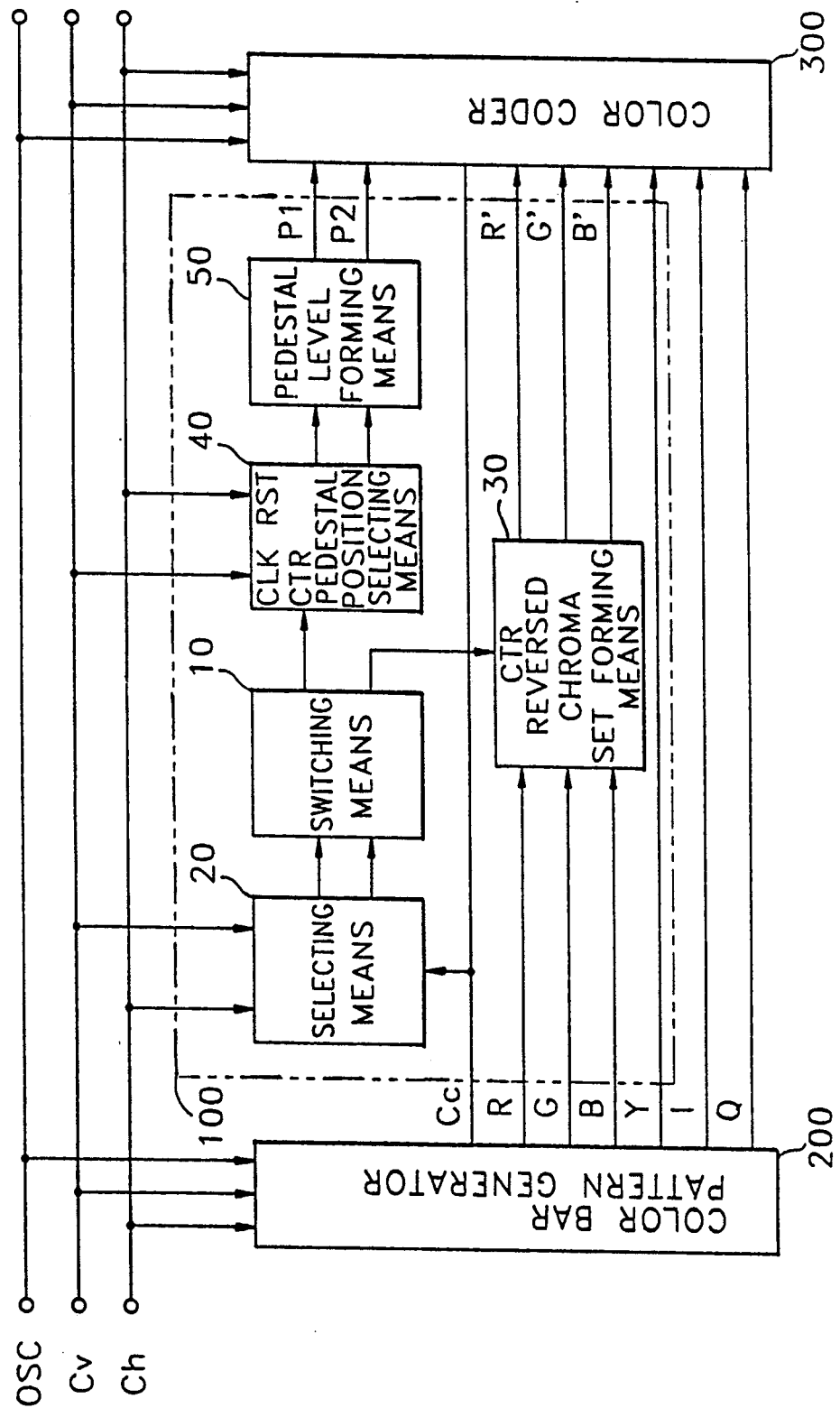
FIG. 3 is a circuit diagram of the selective converting circuit according to the present invention.

Referring to FIG. 3, there is shown a block diagram according to the present invention, in which a selective converting circuit 100 selects the EIA color bar pattern produced from the EIA color bar pattern generator 200 into the EIA color bar pattern as it is or converts it into a SMPTE color bar pattern, then supplies it to a color coder 300 of the broadcasting equipment.

Synchronizing signals Cv such as a vertical control signal and a horizontal control signal Ch and a reference signal OSC are commonly supplied to the EIA color bar pattern generator 200 and the color coder 300 and the selective converting circuit 100 according to the present invention. The EIA color bar pattern generator 200 outputs the color signals R,G,B, the luminance signal Y, the chrominance signals I, Q, and the chrominance control signal CC based on these synchronizing signals.

The selective converting circuit 100 according to the present invention comprises a switching means 10, a line selecting means 20, a reversed chroma set forming means 30, a pedestal position selecting means 40 and a pedestal level forming means 50. The selective converting circuit 100 also includes a pedestal unit adjusting means in the other preferred embodiment.

The line selecting means 20 is reset by the vertical control signal Cv informing the starting of the video output of one field, and counts the input numbers of the horizontal control signal Ch informing the starting of each scanning line and combines the resultant counting value with the chrominance control signal CC, so that in the scanning line on which the reversed chroma set RC is to be formed, the reversed chroma forming signal Sr is supplied to the reversed chroma set forming means 30, and in the scanning line on which the pedestal set PED is to be formed, the pedestal forming signal Sp is output to the pedestal position selecting means 40.

The switching means 10 controls in an off-and-on way the supply of the reversed chrominance forming signal Sr and the pedestal forming signal Sp, so that the EIA mode in which the selective converting circuit 100 according to the present invention is not operated, and the SMPTE mode in which said selective converting circuit 100 is operated are selectively converted from each other. The switching means 10 may be constructed in such a manner that, for example, the chrominance control signal Cc is controlled in the off-and-on way.

When the reversed chroma set forming means 30 receives the reversed chrominance forming signal Sr from the line selecting means 20, color signals R,G,B supplied from the EIA color bar pattern generator 200 are converted to the converted color signals R', G', B' forming the reversed chroma set Rc, and output to the color coder 300.

The pedestal position selecting means 40 is reset by the horizontal control signal Ch when the pedestal forming signal Sp is received from the line selecting means 20, and distribute the interval between the horizontal control signals Ch, that is, horizontal effective scanning period or the horizontal effective period Eh, by the reference pulse OSC and supplies the set-up level forming signal Su to the pedestal level forming means 50 in the horizontal position where the pedestal set PED is to be formed.

The pedestal set PED is composed of a level-down portion PED 1 and a level-up portion PED 2, with the result that the set-up level forming signal Su includes a level-down forming signal and a level-up forming signal.

The pedestal level forming means 50 forms the level-down signal P1 and level-up signal P2 based on the set-up level forming signal Su which is being supplied from the pedestal position selecting means 40, and outputs it to the color coder 300.

Thus, in the EIA mode, the color coder 300 receives the color control signal Cc, the luminance signal Y and the chrominance signal from the EIA color bar pattern generator 200, and also receives the non-converted color signal R,G,B from the selective converting circuit 100 according to the present invention.

While, in the SMPTE mode, the color coder 300 receives the converted color signal R', G', B' instead of the non-converted color signal R, G, B in the above-mentioned EIA mode from the selective converting circuit 100 according to the present invention.

Figure 4:
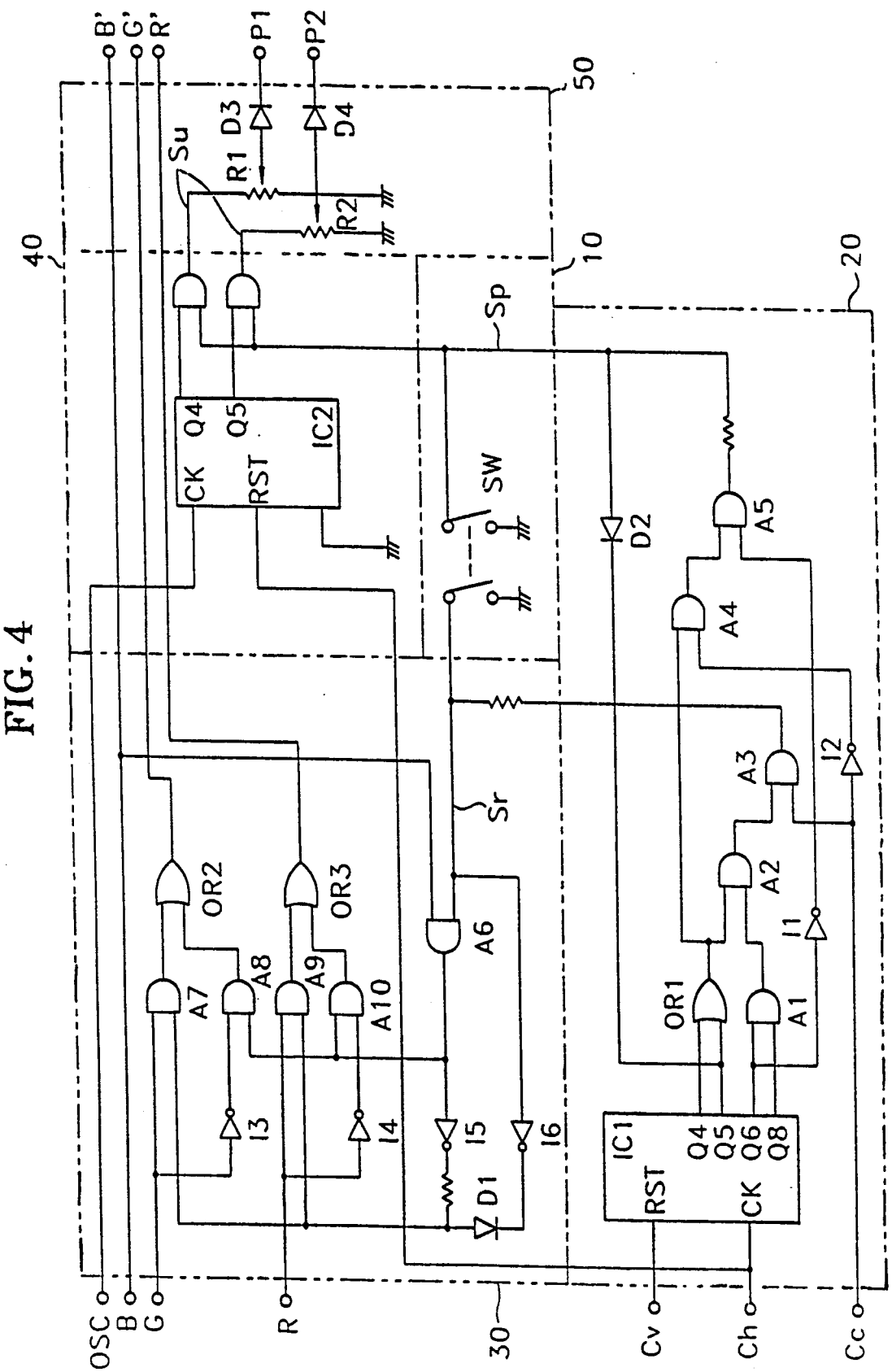
FIG. 4 is an circuit diagram of a embodiment according to the present invention.

FIG. 4 shows an example of a selective converting circuit according to the present invention.

Referring to FIG. 4, there is shown a line selecting means 20 comprising a counter IC1 for counting the input numbers, and AND gates A1 to A5, OR gate OR1, inverters I1 and I2, and diode D2, which are connected to the output terminals Q4, Q5, Q6 and Q8 of the counter IC1, and outputting the reversed chrominance forming signal Sr and pedestal forming signal Sp by logically operating said outputs with the chrominance control signal Cc, where said counter IC1 may be constructed with, for example, 12 bits binary counter of the product No. μPD 4040, NEC, Japan.

The reversed chroma set forming means 30 is constructed by combining AND gates A7 to A10, OR gates OR2 to OR3, inverters I3 to I6, and diode D1, for combining the color signals R,G,B from the EIA color bar pattern generator 200 (shown in FIG. 3).

The pedestal position selecting means 40 comprises a distributor IC2 for distributing the interval between the horizontal control signals, that is, the horizontal scanning period or the horizontal effective period based on a reference pulse after reset according to the horizontal control signal; and AND gates A11 to A12 connected to the output terminals Q4 and Q5 of said distributor IC2 to operate logically these outputs and outputting the set-up level forming signal corresponding to the level-down portion PED1 and level-up portion PED2 of the pedestal set PED, respectively, where the distributor IC2 may be used by, for example, the decoder and divider of the products No. μPD 4017 of NEC, Japan.

A switch means 10 is provided between the line selecting means 20 and the reversed chroma set forming means 30 and the pedestal switch selecting means 40 so that the reversed chrominance forming signal Sr and the pedestal forming signal Sr can be controlled in the on-and-off way.

The pedestal level forming means 50 comprises resistors R1 and R2, diodes D3 and D4 for changing the set-up level forming signal into the level-down signal P1 and level-up signal P2.

The operation of an embodiment according to the present invention will be described below.

Figure 1A:
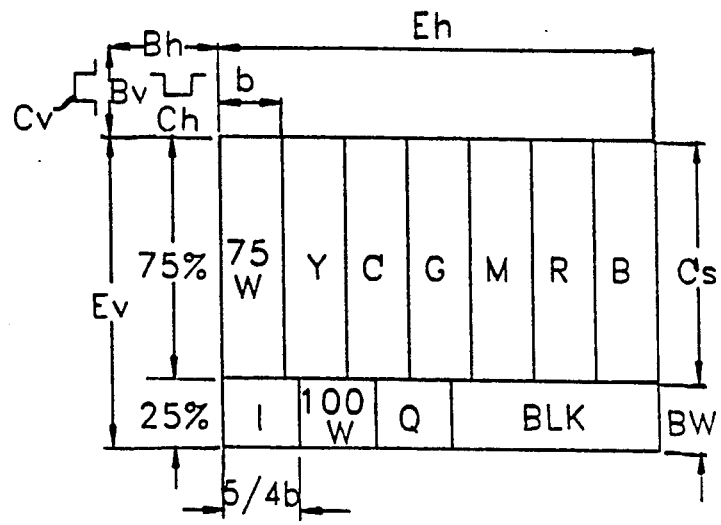
FIG. 1A shows a standard pattern of the typical EIA color bar.
Figure 1B:
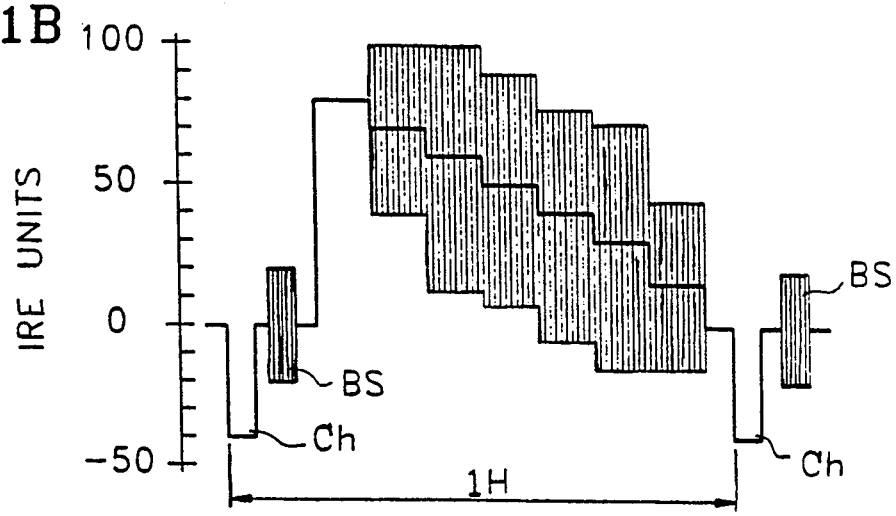
FIG. 1B shows waveforms of the chroma set shown in FIG. 1A.
Figure 1C:
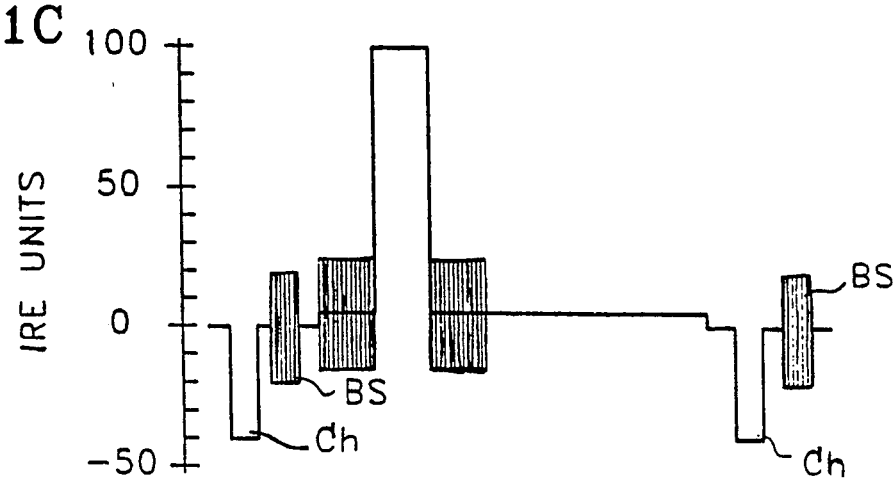
FIG. 1C shows waveforms of the black/white set shown in FIG. 1A.

In the interlace of the standard NTSC broadcasting system, the number of scanning lines constituting one field are 262.5 lines. Therefore, referring to FIG. 1, the chroma set CS of the EIA color bar pattern is formed at for example, the first line to the 191th line, and the black/white set BW is formed between the 192th line to the 262.5th line so that the chrominance control signal Cc can be output with "High" only during the period of the first line to the 191th line.

Figure 2A:
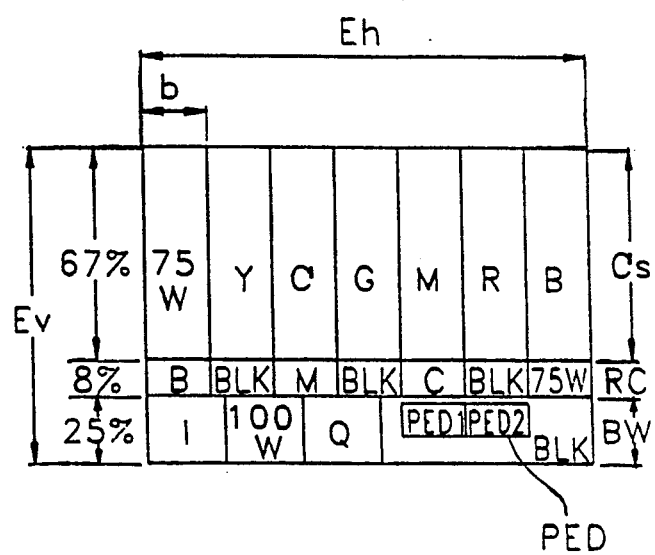
FIG. 2A shows a standard pattern of the typical SMPTE color bar.
Figure 2B:
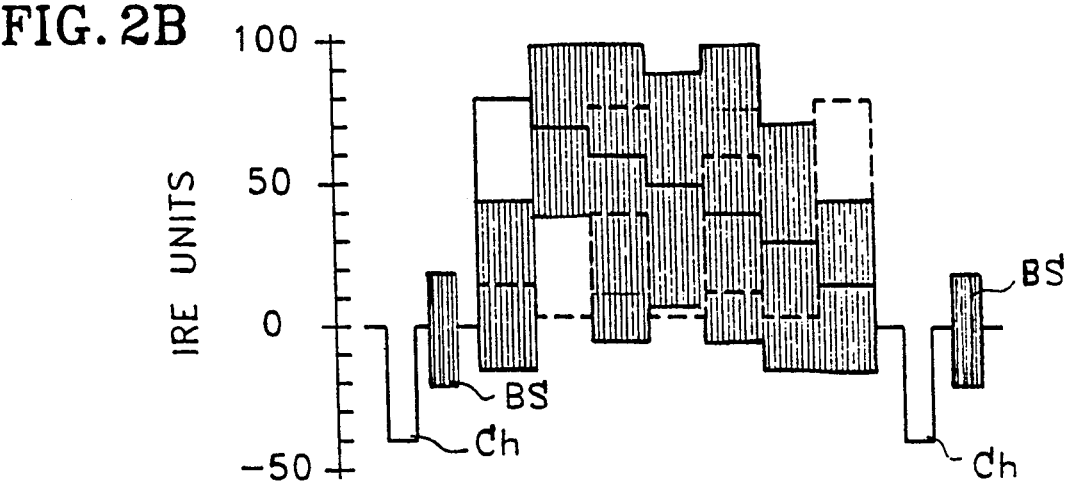
FIG. 2B shows waveforms of the chroma set shown in FIG. 2A.
Figure 2C:
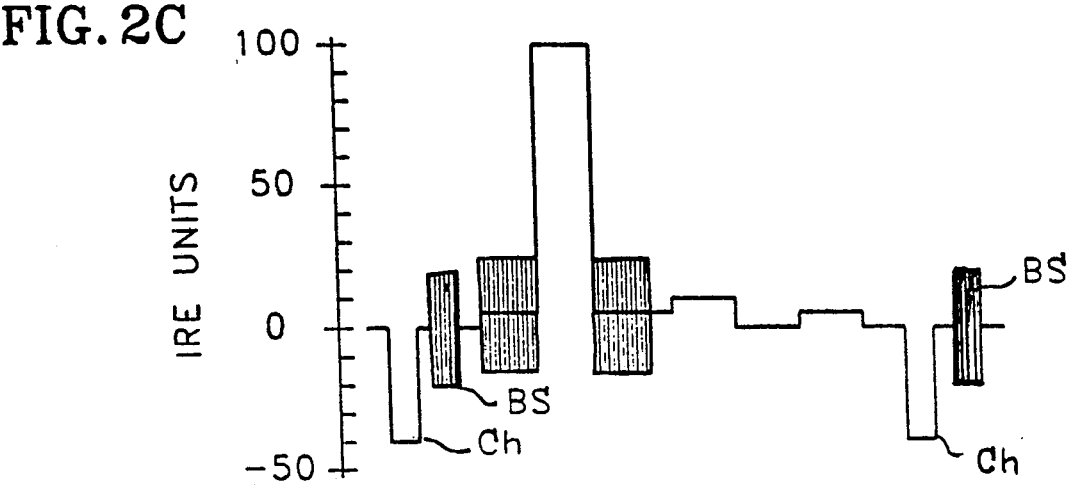
FIG. 2C shows waveforms of the black/white set shown in FIG. 2A.

While in the SMPTE color bar pattern of FIG. 2A, the chroma set CS is formed at the 1st line to the 167th line, and the reversed chroma set RC is formed at the 168th to 191th line, the black/white set BW is formed at the remaining line and the pedestal set PED is formed between the 208th line to the 223th line.

The counter IC1 is reset when the vertical control signal Cv for initiating one field is received and counts the input numbers of the horizontal control signal, and then outputs counting value thereof to each output the terminal Q4, Q5, Q6, Q8 as the binary system.

The outputs of the output terminals Q4 and Q5 are input to the AND gates A2 and A4 through a OR gate OR1, and the output of the output terminals Q6 and Q8 are input to the AND gate A2 through the AND gate A1, and the output of the AND gate A2 forms the reversed chroma forming signal Sr by combining in the AND gate A3 together with the chrominance control signal Cc which is being input as "High" level below the 191th line, and outputs the reversed chrominance forming signal Sr.

The outputs of the counter IC1 around the line at which the reversed chroma set Rc is to be formed are shown in Table 1.

TABLE 1

| Line | Q8 | Q7 | Q6 | Q5 | Q4 | Q3 | Q2 | Q1 |
|------|----|----|----|----|----|----|----|----|
| 166  | 1  | 0  | 1  | 0  | 0  | 1  | 1  | 0  |
| 167  | 1  | 0  | 1  | 0  | 0  | 1  | 1  | 1  |
| 168  | 1  | 0  | 1  | 0  | 1  | 0  | 0  | 0  |
| .    | .  | .  | .  | .  | .  | .  | .  | .  |
| .    | .  | .  | .  | .  | .  | .  | .  | .  |
| 190  | 1  | 0  | 1  | 1  | 1  | 1  | 1  | 0  |
| 191  | 1  | 0  | 1  | 1  | 1  | 1  | 1  | 1  |
| 192  | 1  | 1  | 0  | 0  | 0  | 0  | 0  | 0  |

The output of the AND gate A2 becomes "High" when outputs Q4, Q5, Q6, Q8 of the counter IC1 corresponds to the combination of the 168th to 191th lines, that is, (1,1,0 or 1,1). Meanwhile, in the case of the 232th to 252th line, the signal combination is made in the same manner as the above except that the chrominance control signal Cc inputs "Low", so that the output of AND gate A3 becomes "Low".

In addition, the color signals R, G, B are input to the reversed chroma set forming means 30 from the EIA color bar pattern generator 200, at this time said B signal is supplied to the color coder 300, and also supplied to AND gate A6 together with the reversed chrominance forming signal Sr of the line selecting means 20 to serve as the control signal. The G signal is supplied to the AND gate A7 and inverted by the inverter I3, then supplied to the AND gate A8.

The R signal is supplied to the AND gate A9, and inverted by the invertor I4, then supplied to the AND gate A10.

The reversed chrominance forming signal Sr which is being supplied from the AND gate A3 of the line selecting means 20 is inverted by the inverter I6 and supplied to AND gates A7, A9 through a diode D1, the output of the AND gate A6 is supplied to AND gates A8 and A10 and inverted by the inverter I5 and supplied to AND gates A7 and A9 together with the reversed chrominance forming signal Sr which is inverted. The diode D1 connected to the output stage of the inverter I6 is for supplying "Low" signal to AND gates A7 and A9 when the output level of the inverter I6 is in a lower level than that of the inverter I5.

Figure 5A:
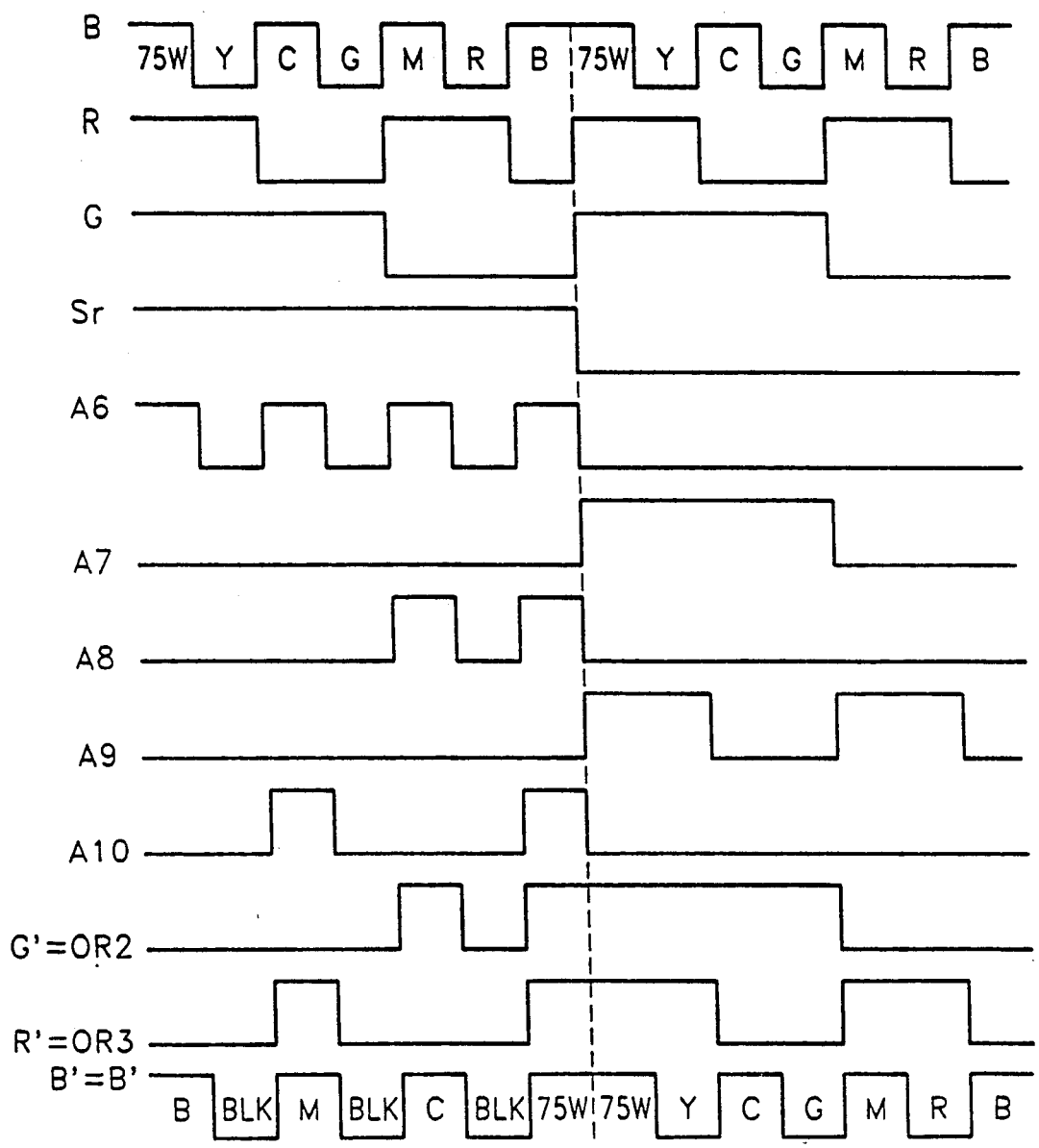
FIG. 5A shows an operational waveform of the reversed chroma set forming means of FIG. 4.

FIG. 5A illustrates the waveforms showing the operation of the above-mentioned reversed chroma set forming means, 30 where the drawing numbers of A6,A7 and A8 corresponds to the output signals of the AND gates A6,A7 and A8, respectively.

Referring to FIG. 5A, when the reversed chrominance forming signal Sr is "High", that is, when in between the 168th line to the 191th line, the reversed chroma set forming means 30 outputs the converted color signals R', G' and B' (shown in left-half portion of FIG. 5A) that the color signals R,G and B input in the order of 75 w, Y,C,G,M,R,B are converted in the order of B, BLK, M, BlK, C, BLK, 75 W to form the reversed chroma set RC, while when the reversed chrominance forming signal Sr is "Low" it outputs the same converted color signals R',G',B' as the input color signal R,G,B (shown in right-half portion of FIG. 5A).

In the meanwhile, the outputs around the line on which the pedestal set is to be formed is shown in Table 2.

TABLE 2

| Line | Output | | | | | | | |
|------|----|----|----|----|----|----|----|----|
|      | Q8 | Q7 | Q6 | Q5 | Q4 | Q3 | Q2 | Q1 |
| 207  | 1  | 1  | 0  | 0  | 1  | 1  | 1  | 1  |
| 208  | 1  | 1  | 0  | 1  | 0  | 0  | 0  | 0  |
| 209  | 1  | 1  | 0  | 1  | 0  | 0  | 0  | 1  |
| .    | .  | .  | .  | .  | .  | .  | .  | .  |
| .    | .  | .  | .  | .  | .  | .  | .  | .  |
| .    | .  | .  | .  | .  | .  | .  | .  | .  |
| 222  | 1  | 1  | 0  | 1  | 1  | 1  | 1  | 0  |
| 223  | 1  | 1  | 0  | 1  | 1  | 1  | 1  | 1  |
| 224  | 1  | 1  | 1  | 0  | 0  | 0  | 0  | 0  |

The output of the AND gate A5 becomes "High" in case of the 200th line to the 223th line and over the 192th line the color control signal Cc becomes "Low".

At this time, since the 200th line to the 207th line results in the unnecessary lines, the output is removed by connecting to the output terminal of the counter IC1 which becomes "Low" in this section.

Figure 5B:
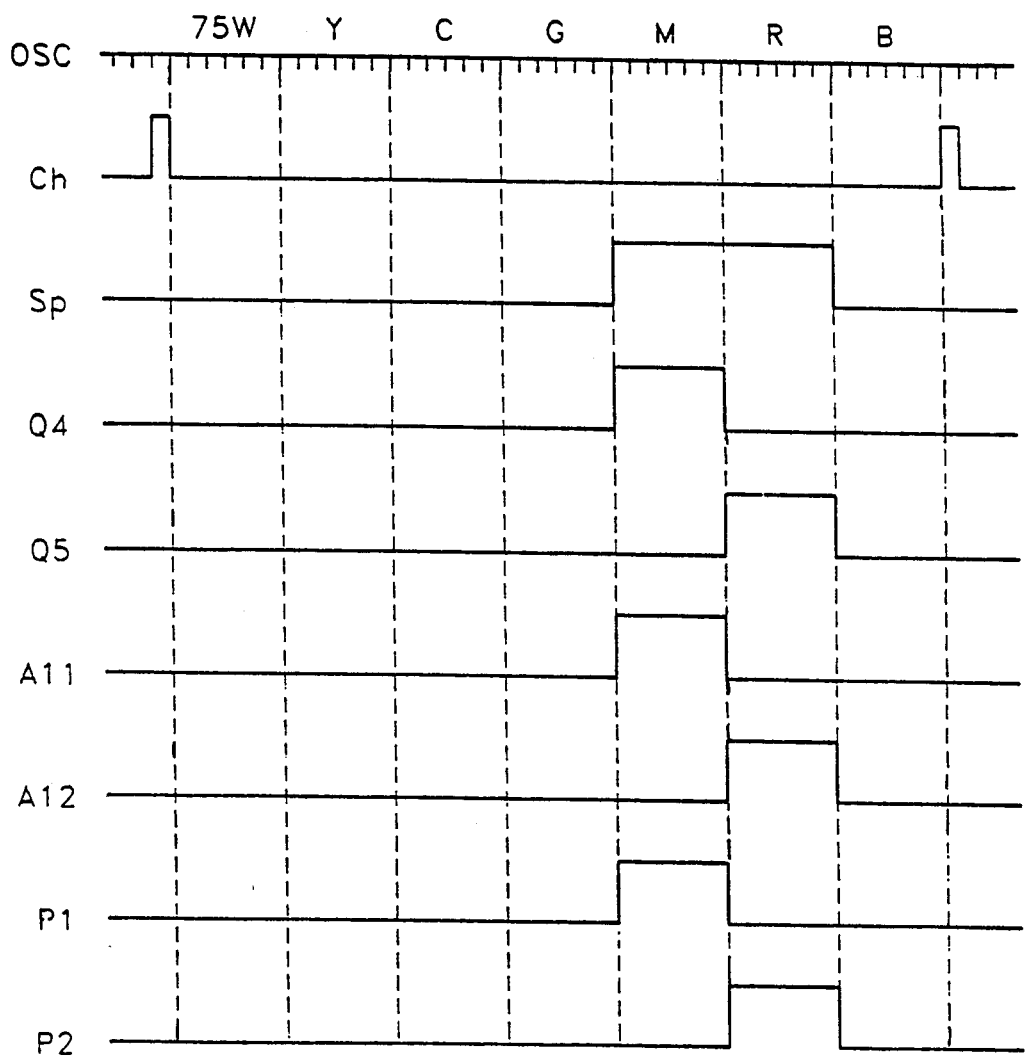
FIG. 5B shows an operational waveform of the pedestal position selecting means and the pedestal set forming means of FIG. 4.

In the meanwhile, the distributor IC2 is reset by the horizontal control signal Ch as shown in FIG. 5B, and distributes the interval between the horizontal control signals as a reference the reference pulse OCS, so that in the horizontal position in which the level-down portion PED1 is to be formed, for example, in the lower part of M, "High" signal is supplied to the AND gate A11 from the output terminal Q4 of the distributor IC2, and in the horizontal position in which the level-up portion PED2 is formed, for example, in the lower part of R, "High" signal is supplied to the AND gate A12 from the output terminal Q5.

When the chrominance control signal Cc is "Low", the pedestal forming signal Sp which becomes "High" in the line on which the pedestal set is formed is supplied to AND gates A11 and A12, respectively, then, said AND gates A11 and A12 combines these inputs and forms the set-up level forming signal Su, so that it is supplied selectively to the resistor R1 or R2 of the pedestal level forming means 50.

The set-up level forming signal Su is controlled to the appropriate level by resistors R1 and R2 and supplied to the color coder 300 (shown in FIG. 3) with level-down signal P1 and level-up signals P2 through diodes D3 and D4.

As described above, the reversed chrominance forming signal Sr which is being supplied to the reversed chroma set forming means 30 and the pedestal forming signal Sp which is being supplied to the pedestal position selecting means 40 are connected selectively to the ground by the switch SW, so that when the switch SW becomes on, each means is not driven due to the ground of the control signal, as a result, the circuit goes to the EIA mode and outputs the EIA color bar pattern, while in case of "off", it results in the SMPTE mode, so that the SMPTE color bar pattern converted from the EIA color bar pattern is output.

Figure 6:
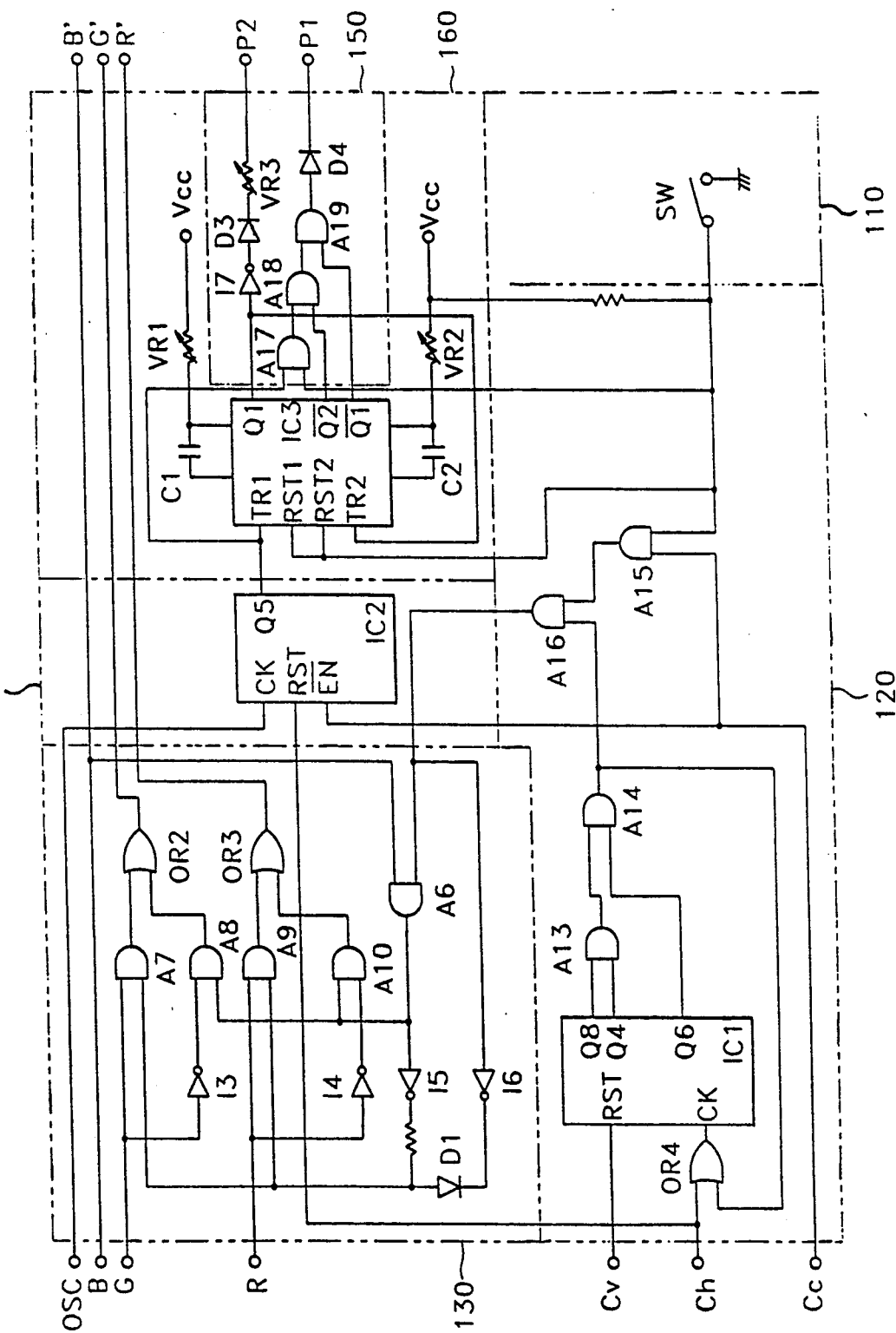
FIG. 6 is a circuit diagram of another embodiment according to the present invention.

FIG. 6 shows the selective converting circuit of the second embodiment according to the present invention, which comprises a pedestal set adjusting means for adjusting the position and configuration of the pedestal set and for correcting the line deviation of the EIA color bar pattern generator.

A pattern generator for an EIA color bar is customized with an integrate circuit and is somewhat differently standardized by each maker. In a first embodiment as described above, an end line of chroma set for EIA color bar pattern is, for example, the 191st line, and on the other hand, it may be one of, for example, the 189th to the 193rd line with 1 or 2 line departeds from the 191st line. Here, when the end line of a chroma set CS for an EIA color bar pattern generator is smaller than a reference end line of a selective converting circuit according to the present invention, that is, the 191st line, for example, when it is the 189th line or the 190th line, any color control signals are not output above this line and the white/black set is output above this line and the white/black set is output serially. Therefore, in this case, there is no problem.

However, when the end line of a chroma set CS for an EIA color bar pattern generator is larger than a reference end line of a selective converting circuit according to the present invention, that is, the 191st line, for example, being the case the 192nd line or 193rd line, a reversed chroma set forming means 130 according to the present invention is operated not more than the 191st line, and a non-converted EIA color bar pattern is output again above the 192nd line, with the result that an incomplete SMPTE color bar pattern is formed.

Accordingly, in a second embodiment of a selective converting circuit according to the present invention a line selection means 120 is made up of a counter IC1 and AND gates A13 to A16 which combine the outputs Q4,Q6 and Q8, and an output from AND gate A14 is combined with a horizontal control signal Ch in an OR gate OR4 and is input to the counter IC1, whereby a line error of the EIA color bar pattern generator is compensated.

The reversed chroma set forming means 130 is comprised identically to the first embodiment as described above. Therefore, the detail description will be omitted here.

A pedestal position selecting means 140 is made up of a distributor IC2 identical to one of the first embodiment, but it has the difference that the color control signal Cc is connected to a disable terminal $\overline{\text{EN}}$, and if there is no input of the color control signal Cc in the disable terminal $\overline{\text{EN}}$, an enable signal is input thereto, with a result that an interval of the horizontal control signal Ch is distributed.

An adjusting means 160 for the pedestal set is made up of a mono-stable multivibrator IC3 and capacitors C1 and C2 and variable resistors VR1 and VR2 for adjusting the width of the output pulse.

The mono-stable multivibrator IC3 may be comprised, for example, with a product μPD 4098 of NEC in Japan.

A pedestal level forming means 150 is made up of three AND gates A17 to A19, an inverter I7, two diodes D3 and D4 and a variable resistor VR3.

On the other hand, a switch SW included in a switching means 110 is connected to the input terminal of an AND gate A15 differently from the case of the first embodiment.

Hereinafter, the second embodiment according to the present invention will be explained except the overlapping part with the first embodiment.

At first, the outputs Q4, Q6 and Q8 from a counter IC1 for counting the number of input of the horizontal control signal CH reset by the vertical control signal Cv are shown the same as Table 1 in the vicinity of the line forming the reversed chroma set RC.

The line selection means 120 outputs a "HIGH" level from an AND gate A14 in the 168th to 191st lines indentically to the first embodiment.

The output of the AND gate A14 and the horizontal control signal Ch are combined in the OR gate OR4 and then input to the counter IC1, with a result that the AND gate A14 outputs the "HIGH" level continuously above the 192nd line.

The output signal from the AND gate A14 is combined in the AND gate A16 together with the output from the AND gate A15 for combining the color control signal Cc and the power supply Vcc. As a result, a reversed chroma set forming signal Sr is output to the reversed chroma set forming means 130.

At this time, the AND gate A14 outputs the "HIGH" level continuously above the 192nd line, but the color control signal Cc is not output in the EIA color bar pattern generator after the end line of the chroma set CS. As a result the line selection means 120 outputs the reversed chroma set forming signal Sr from the 168th line to the end line of the chroma set in the EIA color bar pattern generator.

After this reversed chroma set forming signal Sr is input to the reversed chroma set forming means 130, the reversed chroma set forming means 130 is operated identically to the case of the first embodiment.

That is, it is operated with the same waveform as shown in FIG. 5A, resultedly the converting color signals R', G' and B' being output to the color coder 300 which is shown in FIG. 3.

On the other hand, a distributor IC2 in a pedestal position selection means 140 remains in the disable state when the color control signal Cc is input thereto. Then, when the color control signal Cc is not input thereto, the distributor IC2 is changed to the enable state, resultedly the interval between the horizontal control signals Ch being distributed and the distributed signal output.

Figure 7:
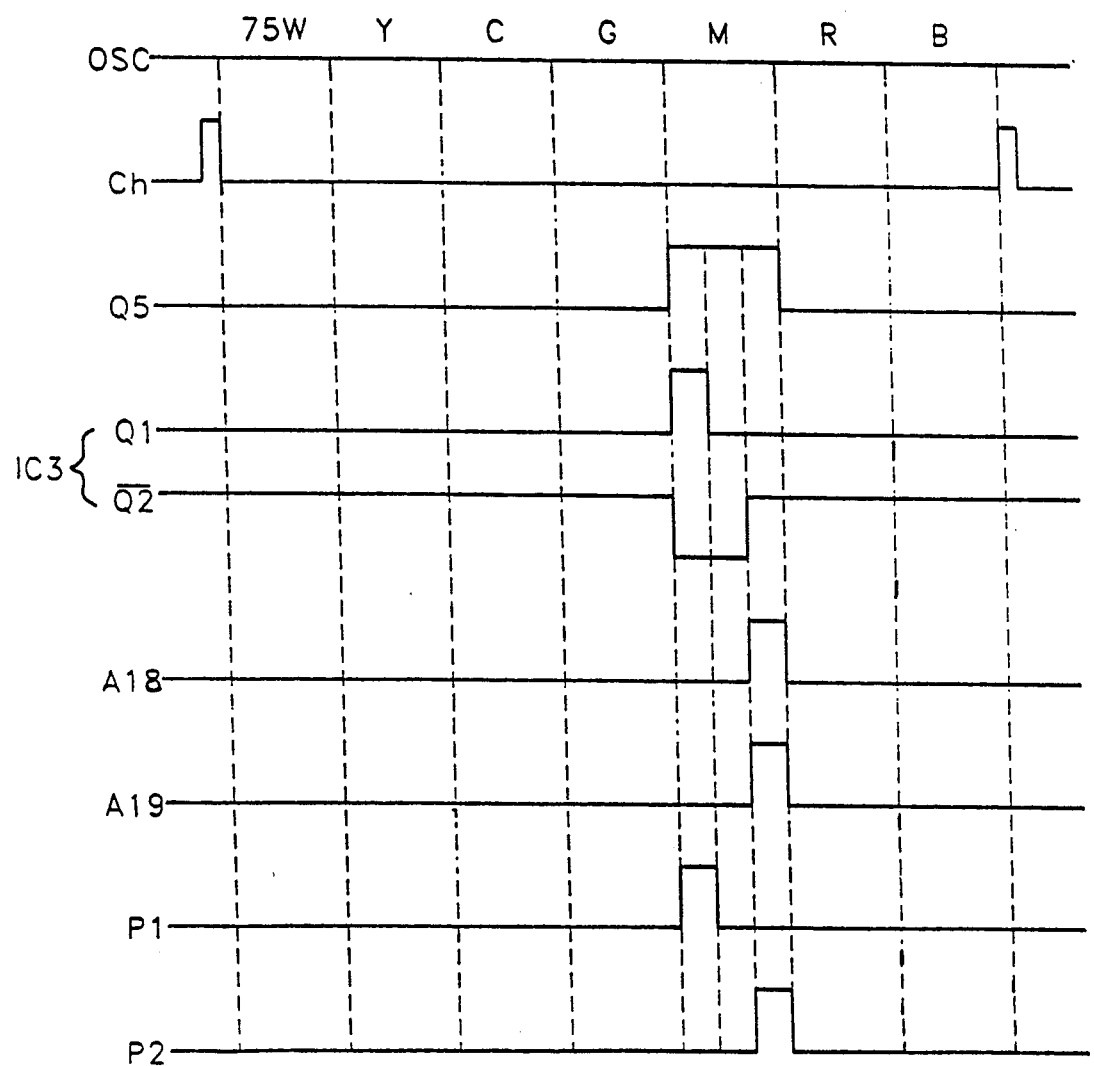
FIG. 7 is a waveform diagram showing the operation of the circuit shown in FIG. 6.

As shown in FIG. 7, an output Q5 from the distributor IC2 becomes "HIGH" at the bottom of the R color bar and is input to an input terminal TR1 of a mono-stable multivibrator IC3. Accordingly, the mono-stable multivibrator IC3 outputs the output signal Q1 with a modulated pulse width and the output Q1 is output as a level down signal P1 through an inverter I7, a diode D3 and a variable resistor VR3. On the other hand, this output Q1 is input to an input terminal TR2 so as to form an output Q2. Accordingly, two AND gates A18 and A19 output the combinational signals as shown in FIG. 6, with a result of outputting a level-up signal P2 through a diode D4.

Here, if a variable resistor VR3 is adjusted, a level-up signal P2, that is, a set-up level of a pedestal portion PED can be adjusted.

Figure 8A:
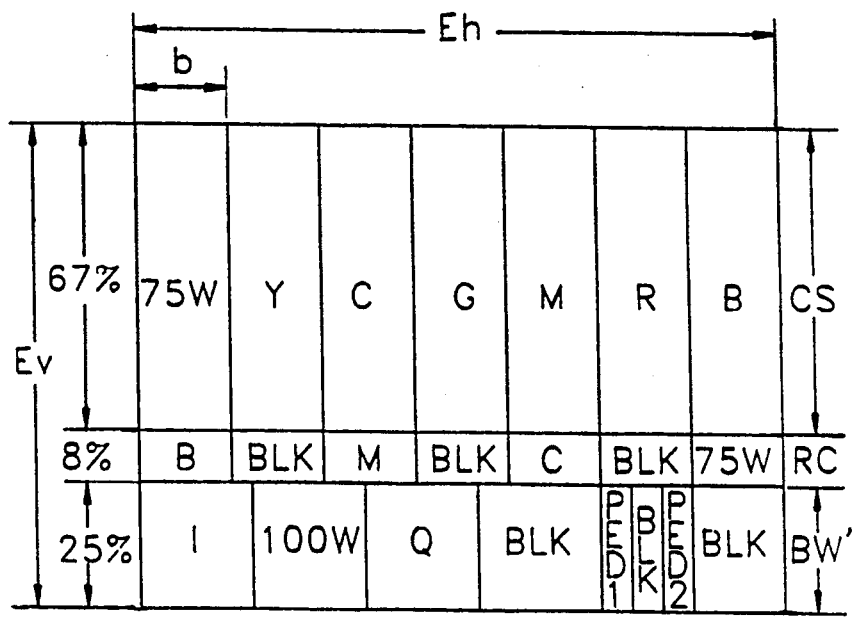
FIG. 8A shows a pattern of the SMPTE color bar output by the circuit shown in FIG. 6.

The SMPTE color bar pattern formed by the second embodiment according to the present invention as described above is the same as shown in FIG. 8A.

Figure 8B:
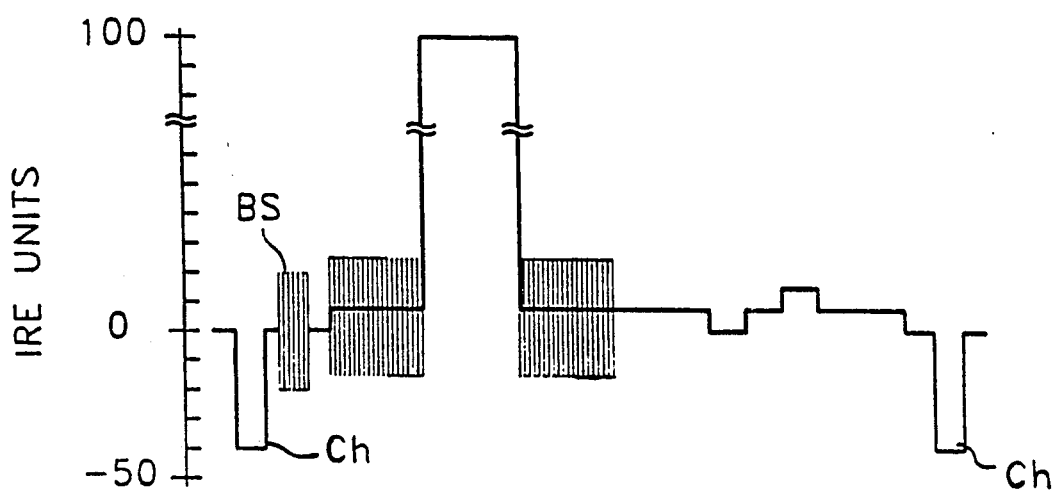
FIG. 8B is a waveform diagram of the black/white set shown in FIG. 8A.

In this SMPTE color bar pattern, the pedestal portion in the bottom of the R color bar is made up of the level down portion PED1, the black portion BLK, the level up portion PED2 having the vertical bar shapes differently from the standard pattern as shown in FIG. 2A, and the output waveform of the black and white portion BW is the same as shown in FIG. 8B.

What is claimed is:

1. A circuit for selectively converting a color bar pattern to be output in the form of a luminance signal, a chroma signal and a chrominance control signal in an EIA color bar pattern generator controlled by a reference pulse, a vertical control signal and a horizontal control signal, said circuit outputting as it is the EIA color bar pattern including a chroma set and a black/white set, or outputting by converting it into the SMPTE color bar pattern including a reversed chroma set added to the chroma set and a pedestal set added to the black/white set, comprising:

switching means for selectively converting the circuit to the EIA mode or SMPTE mode;

line selecting means for counting the input number of the horizontal control signal, reset by means of the vertical control signal, outputting a reversed chrominance forming signal in the line on which the reversed chrominance set is to be formed and outputting a pedestal forming signal in the line on which the pedestal set is to be formed, on said SMPTE color bar pattern by combining the counting value thereof with the chrominance control signal;

reversed chroma set forming means for outputting said chrominance signal as it is if said reversed chrominance forming signal is not input from the line selecting means, while, for outputting by the chrominance signal into the converting chrominance signal forming said reversed chroma set, after receiving the chrominance signal from the EIA color bar pattern generator;

pedestal position selecting means for distributing an interval between said horizontal control signals as the reference said reference pulse being reset by means of the horizontal control signal, and for outputting the set-up level forming signal in the position where said pedestal set is to be formed on the SPMTE color bar pattern if the pedestal signal is input from the line selecting means; and pedestal level forming means for receiving the set-up level forming signal of the pedestal position selecting means and for outputting the level up/down signals so that said pedestal set can be formed.

2. The circuit for selectively converting a color bar pattern as claimed in claim 1, wherein said line selecting means comprises a counter for counting the input number of the horizontal control signal being reset by means of the vertical control signal, a first set of gate means for combining the outputs of the counter second gate means for combining the outputs of said first set of gate means with the chrominance control signal and for forming the reversed chrominance forming signal, third gate means for combining the output of one of said gates of said first set of gate means with said inverted chrominance control signal, and fourth gate means for combining the output of said third gate means with the inverted output of said counter, and for outputting the pedestal forming signal.

3. The circuit for selectively converting a color bar pattern as claimed in claim 1, wherein said line selecting means comprises a counter for counting the input number of said horizontal control signal being reset by means of said vertical control signal, said counter combining the output of the counter to provide a resultant value, and re-inputting the resultant value to the counter so that line error of the EIA color bar pattern output from the EIA color bar pattern generator can be corrected.

4. The circuit for selectively converting a color bar pattern as claimed in claim 1, wherein said pedestal position selecting means comprises means for distributing the interval between the horizontal control signal being reset by means of said horizontal control signal, and for outputting a set-up level forming signal in position where the level-down portion and level-up portion of the pedestal set is to be formed.

5. The circuit for selectively converting a color bar pattern as claimed in claim 1, further comprising a pedestal set adjusting means for adjusting the position and the shape of the level-down portion and level-up portion of the pedestal set.

6. The circuit for selectively converting a color bar pattern as claimed in claim 5, wherein said pedestal set adjusting means comprises a mono-stable multi-vibrator variable resistors and capacitors for adjusting output pulse width coupled to provided by said multi-vibrator.

7. A color bar pattern converter, comprising:
means for receiving a plurality of synchronizing signals;
color pattern generator means for generating a chrominance control signal and a first color pattern comprising a plurality of colored line segments in a first sequence in dependence upon reception of said plurality of synchronizing signals;
converter means for selectively either providing said first color pattern received from said color pattern generator means or converting said first color pattern into a second color pattern and providing said second color pattern in dependence upon reception of said plurality of synchronizing signals, said second color pattern comprising a plurality of colored line segments in a second sequence; and
color coder means for color encoding one of said first color pattern and said second color pattern provided by said converter means.

8. A color bar pattern converter as claimed in claim 7, wherein said converter means comprises:
line selector means for generating a reversed control signal and a pedestal control signal in dependence upon reception of said plurality of synchronizing signals and said chrominance control signal;
switch means for selectively enabling and disabling transmission of said reversed control signal and said pedestal control signal;
reversed chrominance generator means for converting said first color pattern into said second color pattern by reversing said plurality of colored line segments in said first color pattern to generate said second sequence of said plurality of colored line segments representing said second color pattern in response to said reversed control signal; and
pedestal selector means for selecting a pedestal position for said second color bar pattern in response to said pedestal control signal and in dependence upon reception of said plurality of synchronizing signals.

9. A color bar pattern converter as claimed in claim 8, wherein said line selector means comprises:
counter means for counting a number of a horizontal synchronizing signal in dependence upon reception of a vertical synchronizing signal initiating a start of a field period to provide a plurality of first intermediate signals, said field period corresponding to 262.5 scanning lines;
first plurality of gate means for providing a plurality of second intermediate signals in dependence upon reception of said plurality of first intermediate signals;
second plurality of gate means for combining said plurality of second intermediate signals and said chrominance control signal to provide said reverse control signal;
inverter means for inverting said chrominance control signal to provide an inverted chrominance control signal; and
third plurality of gate means for combining at least one of said plurality of second intermediate signals, inverted ones of said plurality of first intermediate signals and said inverted chrominance control signal to provide said pedestal control signal.

10. A color bar pattern converter as claimed in claim 8, wherein said pedestal selector means comprises:
means for distributing intervals between a horizontal synchronizing signal in response to pulses of a reference signal to provide first and second intermediate signals; and
gate means for logically combining said first and second intermediate signals with said pedestal control signal to generate one of a first pedestal signal indicative of an increasing pedestal position, and a second pedestal signal indicative of a decreasing pedestal position.

11. A color bar pattern converter, comprising:
means for receiving a vertical synchronizing signal, a horizontal synchronizing signal and a reference signal;
color bar pattern generator means for generating a chrominance control signal and a first color bar pattern in dependence upon reception of said vertical synchronizing signal, said horizontal synchronizing signal and said reference signal, said first color bar pattern being a color bar pattern established by an electronic industries association having a first chroma set comprising a plurality of color signals, and a first black/white set comprising a plurality of carrier signals;
converter and selector means for selectively either providing said first color bar pattern received from said color bar pattern generator means or converting said first color bar pattern into a second color bar pattern and providing said second color bar pattern in dependence upon reception of said vertical synchronizing signal, said horizontal synchronizing signal and said reference signal, said second color bar pattern being a color bar pattern established by a society of motion picture and television engineers having a second chroma set comprising said plurality of color signals, a third chroma set comprising selected color signals, and a second black/white set comprising said plurality of carrier signals and pedestal signals; and color coder means for color encoding one of said first color bar pattern and said second color bar pattern provided by said converter and selector means.

12. A color bar pattern converter as claimed in claim 11, wherein said converter and selector means comprises:
- line selector means for generating a reversed control signal and a pedestal control signal in dependence upon reception of said vertical and horizontal synchronizing signals and said chrominance control signal;
- switch means for selectively enabling and disabling transmission of said reversed control signal and said pedestal control signal simultaneously;
- reversed chrominance generator means for converting said first color bar pattern into said second color bar pattern by reversing said first chroma set of said first color bar pattern to provide said second and third chroma sets of said second color bar pattern in response to said reversed control signal; and
- pedestal selector means for selecting a pedestal position for said second color bar pattern in response to said pedestal control signal and in dependence upon reception of said reference signal and said horizontal synchronizing signal.

13. A color bar pattern converter as claimed in claim 12; wherein said line selector means comprises:
- counter means for counting a number of pulses of said horizontal synchronizing signal in dependence upon reception of said vertical synchronizing signal initiating a start of a field period to provide a plurality of first intermediate signals, said field period corresponding to 262.5 scanning lines;
- first plurality of gate means for providing a plurality of second intermediate signals in dependence upon reception of said plurality of first intermediate signals;
- second plurality of gate means for combining said plurality of second intermediate signals and said chrominance control signal to provide said reversed control signal;
- inverter means for inverting said chrominance control signal to provide an inverted chrominance control signal; and
- third plurality of gate means for combining at least one of said plurality of second intermediate signals, inverted ones of said plurality of first intermediate signals and said inverted chrominance control signal to provide said pedestal control signal.

14. A color bar pattern converter as claimed in claim 12, wherein said pedestal selector means comprises:
- means for distributing intervals between said horizontal synchronizing signal in response to pulses of said reference signal to provide first and second intermediate signals; and
- gate means for logically combining said first and second intermediate signals with said pedestal control signal to generate one of a first pedestal signal indicative of an increasing pedestal position, and a second pedestal signal indicative of a decreasing pedestal position.

15. A color bar pattern converter, comprising:
- means for receiving a vertical synchronizing signal, a horizontal synchronizing signal and a reference signal;
- color bar pattern generator means for generating a chrominance control signal and a first color bar pattern in dependence upon reception of said vertical synchronizing signal, said horizontal synchronizing signal and said reference signal, said first color bar pattern corresponding to a color bar pattern established by an electronic industries association having a plurality of color signals, a plurality of chrominance signals, and a luminance signal;
- converter means for receiving said plurality of color signals of said first color bar pattern and said chrominance control signal to either provide said first color bar pattern or selectively reverse said plurality of color signals, generate a plurality of reversed color signals and a pedestal signal in dependence upon reception of said vertical synchronizing signal, said horizontal synchronizing signal, said reference signal and said chrominance control signal, said plurality of reversed color signals and said pedestal signal constituting a second color bar pattern, and provide said second color bar pattern; and
- color coder means for color encoding one of said first color bar pattern and said second color bar pattern provided by said converter means.

16. A color bar pattern converter as claimed in claim 15, wherein said converter means comprises:
- line selector means for generating a reversed control signal and a pedestal control signal in dependence upon reception of said vertical and horizontal synchronizing signals and said chrominance control signal;
- switch means for selectively enabling and disabling transmission of said reversed control signal and said pedestal control signal simultaneously;
- reversed chrominance generator means for converting said first color bar pattern into said second color bar pattern by reversing said plurality of color signals of said first color bar pattern to provide said plurality of reversed color signals and said pedestal signal constituting said second color bar pattern in response to said reversed control signal; and
- pedestal selector means for selecting a pedestal position for said second color bar pattern in response to said pedestal control signal and in dependence upon reception of said reference signal and said horizontal synchronizing signal.

17. A color bar pattern converter as claimed in claim 16, wherein said line selector means comprises:
- counter means for counting a number of pulses of said horizontal synchronizing signal in dependence upon reception of said vertical synchronizing signal initiating a start of a field period to provide a plurality of first intermediate signals, said field period corresponding to 262.5 scanning lines;
- first plurality of gate means for providing a plurality of second intermediate signals in dependence upon reception of said plurality of first intermediate signals;
- second plurality of gate means for combining said plurality of second intermediate signals and said chrominance control signal to provide said reversed control signal;
- inverter means for inverting said chrominance control signal to provide an inverted chrominance control signal; and
- third plurality of gate means for combining at least one of said plurality of second intermediate signals, inverted ones of said plurality of first intermediate signals and said inverted chrominance control signal to provide said pedestal control signal.

18. A color bar pattern converter as claimed in claim 17, wherein said pedestal selector means comprises:

means for distributing intervals between said horizontal synchronizing signal in response to pulses of said reference signal to provide third and fourth intermediate signals; and gate means for logically combining said third and fourth intermediate signals with said pedestal control signal to generate one of a first pedestal signal indicative of an increasing pedestal position, and a second pedestal signal indicative of a decreasing pedestal position.

* * * * *

UNITED STATES PATENT AND TRADEMARK OFFICE
CERTIFICATE OF CORRECTION

PATENT NO. : 5,194,936
DATED : 16 March 1993
INVENTOR(S) : Dae-su Jeon It is certified that error appears in the above-identified patent and that said Letters Patent is hereby corrected as shown below:

IN THE ABSTRACT

Line 19, change "Selecting means for distributing a" to -- Selecting means for distributing an--;

Column 1,

Line 38,     delete the comma before "Ev"; and insert a comma after "Ev";

Column 2,

Line 21,     change "In the meanwhile" to --In the meantime--; and change "have" to --has--;

Line 51,     change "another" to --other--;

Column 3,

Line 46,     change "FIG. 4 is an" to --FIG. 4 is a--;

UNITED STATES PATENT AND TRADEMARK OFFICE
CERTIFICATE OF CORRECTION

PATENT NO. : 5,194,936
DATED : 16 March 1993
INVENTOR(S) : Dae-su Jeon It is certified that error appears in the above-identified patent and that said Letters Patent is hereby corrected as shown below:

Column 4,

Line 3,         after "Synchronizing signals", delete "Cv" ;

Line 4,         before "and a horizontal control", insert --Cv--;

Line 47,       change "Rc" to --RC--;

Column 5,

Line 60,       change "191th line" to --191st line--;

Line 61,       change "192th line" to --192nd line--;

Line 64,       change "191th line" to --191st line--;

Line 68,       change "191th line" to --191st line--;

Column 6,

Line 2,         change "223th" to --223rd--;

Line 6,         change "outputs counting" to --outputs the counting--;

Line 9,         change "through a OR gate" to --through an OR gate--;

UNITED STATES PATENT AND TRADEMARK OFFICE
CERTIFICATE OF CORRECTION

PATENT NO. : 5,194,936
DATED : 16 March 1993
INVENTOR(S) : Dae-su Jeon

It is certified that error appears in the above-identified patent and that said Letters Patent is hereby corrected as shown below:

Line 16, change "191th" to --191st--;

Line 19, change "Rc" to --RC--;

Line 36, change "191th" to --191st--;

Line 37, change "232th" to --232nd--;

Line 38, change "252th" to --252nd--;

Line 57, change "A7" to --A8--;

UNITED STATES PATENT AND TRADEMARK OFFICE
CERTIFICATE OF CORRECTION

PATENT NO. : 5,194,936
DATED : March 16, 1993
INVENTOR(S) : Dae-su Jeon

It is certified that error appears in the above-indentified patent and that said Letters Patent is hereby corrected as shown below:

Column 7,

Line 5,      change "191th" to --191st--;

Line 15,      change "In the meanwhile" to --In the meantime--;

Line 31,      change "223th" to --223rd--;

Line 32,      change "192th" to --192nd--;

Line 37,      change "In the meanwhile" to --In the meantime--;

Column 8,

Line 46,      change "the" to --that--;

Signed and Sealed this

Twenty-seventh Day of September, 1994

Attest:

BRUCE LEHMAN

*Attesting Officer*      *Commissioner of Patents and Trademarks*